(12) United States Patent
Takimiya et al.

(10) Patent No.: US 6,521,723 B2
(45) Date of Patent: Feb. 18, 2003

(54) METHOD AND APPARATUS FOR DETECTING AGGLOMERATES

(75) Inventors: Koji Takimiya, Sodegaura (JP); Tsutomu Konaka, Ichihara (JP); Mitsuru Tamura, Sodegaura (JP)

(73) Assignee: Sumitimo Chemical Company, Limited, Osaka (JP)

( * ) Notice: Subject to any disclaimer, the term of this patent is extended or adjusted under 35 U.S.C. 154(b) by 0 days.

(21) Appl. No.: 10/090,790

(22) Filed: Mar. 6, 2002

(65) Prior Publication Data
US 2002/0099151 A1 Jul. 25, 2002

Related U.S. Application Data

(62) Division of application No. 09/575,245, filed on May 22, 2000, now Pat. No. 6,414,093.

(30) Foreign Application Priority Data

Dec. 10, 1999 (JP) .......................................... 11-351844

(51) Int. Cl.[7] ................................................. C08F 2/34
(52) U.S. Cl. ....................... 526/88; 422/139; 73/861.08
(58) Field of Search .......................... 526/88; 422/139; 73/861.08

(56) References Cited

FOREIGN PATENT DOCUMENTS

| EP | 0 517 530 A2 A3 | 12/1992 |
|---|---|---|
| EP | 0949489 A1 * | 10/1999 |
| JP | 06-136013 | 5/1994 |
| JP | 10-36447 | 2/1998 |
| JP | 10036447 A * | 2/1998 |

* cited by examiner

Primary Examiner—Peter D. Mulcahy
Assistant Examiner—William Cheung
(74) Attorney, Agent, or Firm—Sughrue Mion, PLLC

(57) ABSTRACT

A protecting tube 51 is disposed inside the mixed phase container 1 with one end fixed to the inside of the mixed phase container 1 and the other end projecting freely into the mixed phase container 1. A detecting rod 60 is inserted into the free end of said protecting tube 51 and fixed to the protecting tube 51 with a part of the detecting rod 60. Magnets 61 are mounted in a uniform magnetic flux on the free end of the detecting rod 60 and is movable about a point F1 of the detecting rod 60 as a fulcrum. Agglomerates 20 in the mixed phase container 1 are detected by measuring magnetic flux fluctuations produced by movement of the magnets 61.

6 Claims, 6 Drawing Sheets

F I G. 3
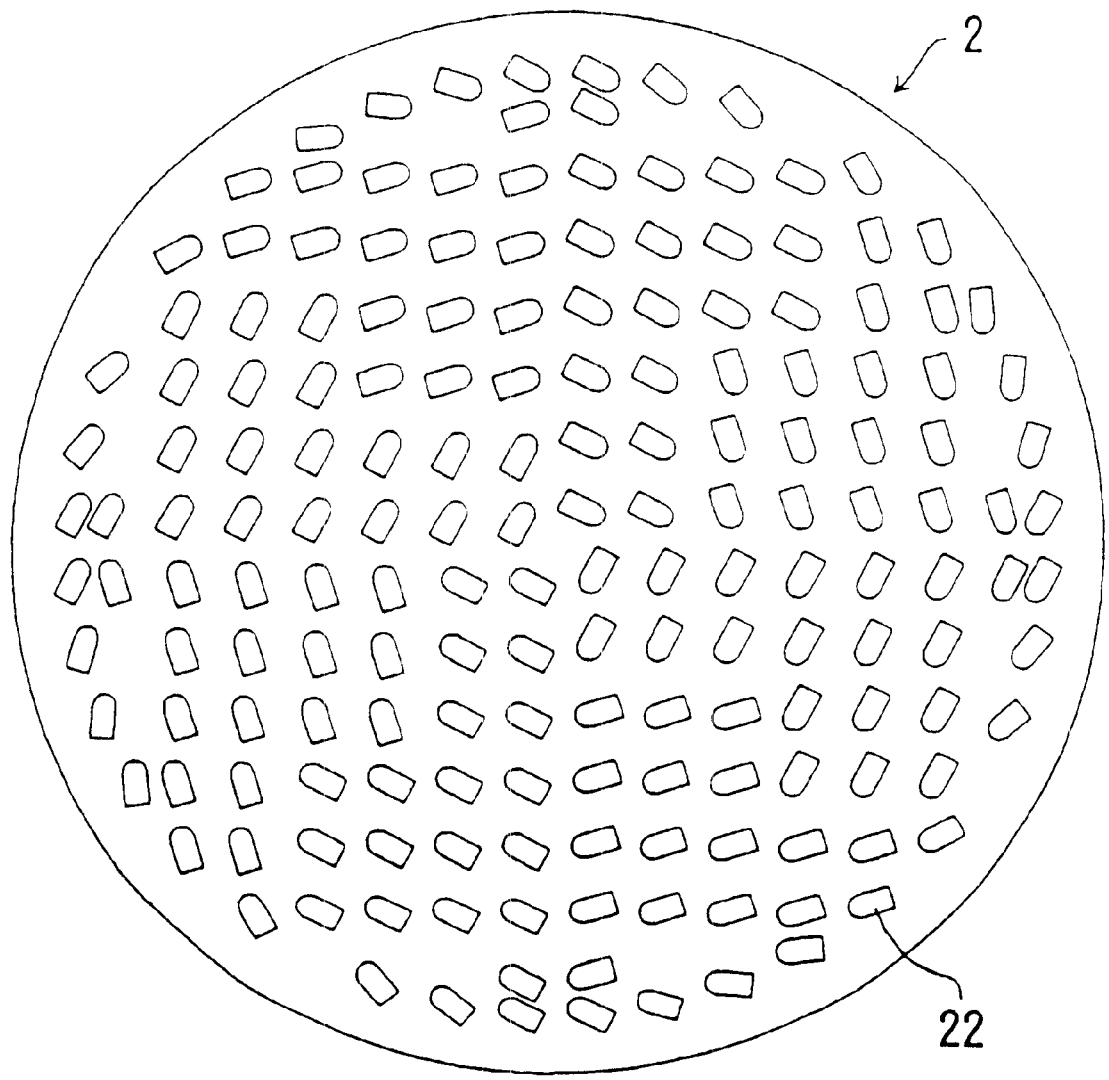

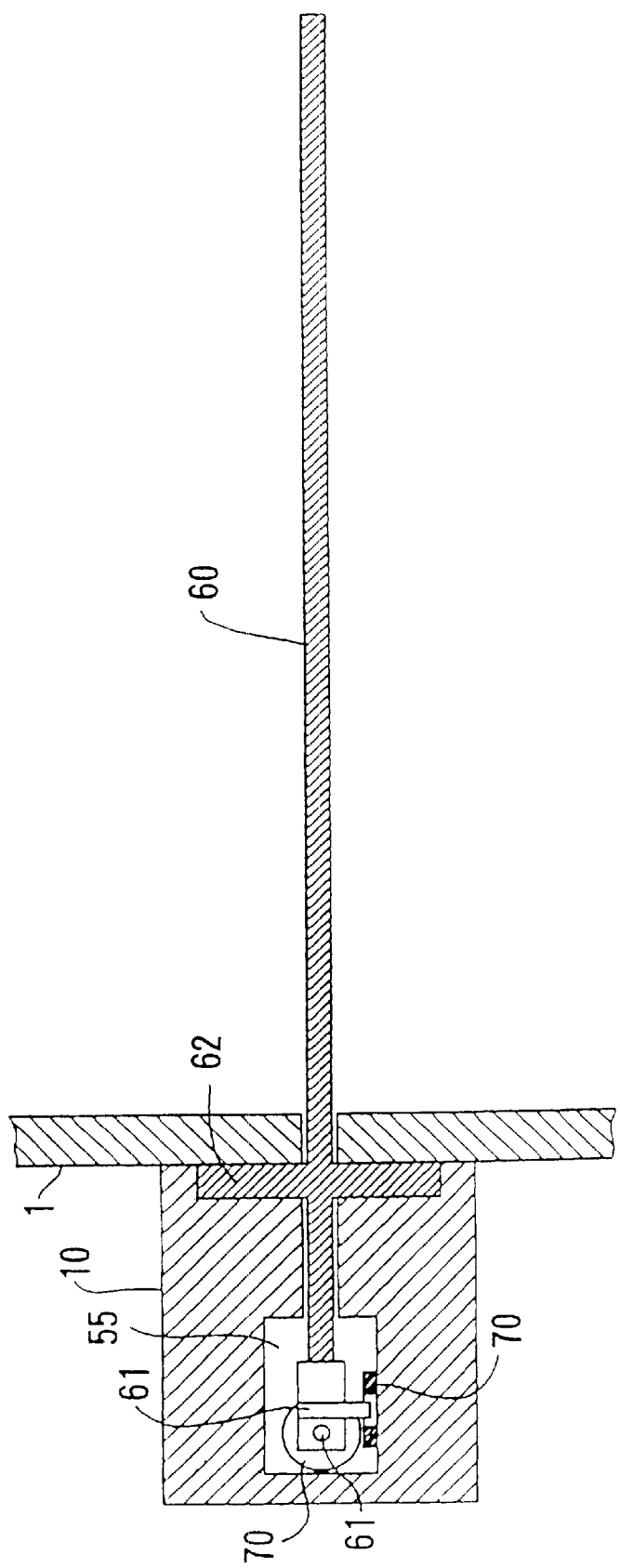

METHOD AND APPARATUS FOR DETECTING AGGLOMERATES

This is a divisional of Application Ser. No. 09/575,245 filed May 22, 2000 now U.S. Pat. No. 6,414,093; the disclosure of which is incorporated herein by reference.

BACKGROUND OF THE INVENTION

1. Field of the Invention

The present invention relates to a method and apparatus for detecting agglomerates formed in a mixed phase container such as a fluidized-bed olefin polymerization reactor container, and to a method and apparatus for fluidized-bed olefin polymerization.

2. Description of the Related Art

It is well known in the art that a method of radiation is being used for detecting agglomerates formed in a mixed phase container, such as a fluidized-bed olefin polymerization reactor container (refer to Japanese Patent Publication No.62-28961). In the radiation method, a radiation source is placed in the center of the container and a plurality of radiation detectors are disposed around the container. In order to detect the existence and the size of agglomerates, the detectors detect density fluctuations in the mixed phase between the radiation source and the detectors by using the radiation.

Another method for detecting agglomerates in the mixed phase container, shown in Japanese Laid-open Patent Publication No.4-361150, employs an electrostatic capacitance detecting method. Means for detecting electrostatic capacitance is disposed on the inner wall of the mixed phase container. This method is based on detecting fluctuations of electrostatic capacitance, since the density (dielectric constant) of agglomerates is greater than that of the mixed phase. When the agglomerates as gel-like are formed and attached on the wall in the mixed phase container, the detecting means detects fluctuations in the electrostatic capacitance thereof. Therefore, the detecting means is able to monitor the state of agglomerates by measuring the amount of fluctuations in electrostatic capacitance.

Further, another method for detecting agglomerates employs a detecting rod having a strain detecting means in the mixed phase container, as shown in Japanese Laid-open Patent Publication No.10-36447. According to this method, it is possible to detect the existence and the size of agglomerates formed in the mixed phase container by detecting an amount of the strain generated in the detecting rod when agglomerates collide with the detecting rod. Accordingly, the detecting rod having strain gauges is disposed in the mixed phase container and measures the strain in the detecting rod by collision of agglomerates to detect the existence and the size of agglomerates.

However, the method described above employing radiation to detect agglomerates requires special attention. For example, a fluidized-bed olefin polymerization reactor container is generally an enormous container of roughly cylindrical shape having a diameter of several meters and a height of several tens of meters. A worker must enter the container to remove the blockage when blockage occurs, or to perform the inspections at periodic inspections. Accordingly, since a radiation source is present in the container, sufficient considerations must be made to ensure the safety of workers performing such operations.

While the method employing an electrostatic capacitance detecting means to detect agglomerates is suitable for detecting agglomerates adhered to the inner walls of the container and has no problem related to safety, the method is not sufficiently precise for detecting agglomerates which are moving within the container. Further, since the difference between the density of small agglomerates and that of normal olefin polymer product is small, this method is not sufficient even for detecting agglomerates adhered to the inner walls of the container.

The method of detecting agglomerates using a strain detecting device does not have the problems described above. However, in this method, it is essential that the agglomerates effectively collide with the detecting rod. Since the agglomerates formed in the container move along with the flow of gas and powders such as products of the olefin polymer and/or catalysts in the mixed phase, it is necessary to know beforehand how gas and powders in the mixed phase will flow. Or else, agglomerates will not collide with the detecting rod with an effective force, thereby greatly lowering the sensitivity of detection.

Further, the values measured by strain gauges are proportional to the amount of strain in the detecting rod. Accordingly, collisions by small agglomerates will only cause slight fluctuations in the measured value, which is not enough to be detected. Hence, this method is not sufficiently sensitive for detecting agglomerates weighing 500 grams or less.

In the case of large agglomerates, agglomerates occasionally accumulate on the part of the detecting rod facing with the flow. If agglomerates accumulate on the detecting rod when using strain gauges, the strain in the detecting rod will remain and the detecting rod will continue to output signals, effectively preventing detection of newly generated agglomerates or variations in the mixed phase.

SUMMARY OF THE INVENTION

The present invention has been made in view of the above drawbacks. It is an object of the present invention to provide a safe method and apparatus capable of detecting even small agglomerates with a high degree of precision and sensitivity. It is another object of the present invention to provide a method and apparatus for fluidized-bed olefin polymerization.

According to an aspect of the present invention, there is provided a method for detecting agglomerates in a mixed phase container in which a mixed phase of gas and powders is formed, the method comprising: disposing a detecting rod with one end projecting freely into the container and the other end projecting freely at outside of the container, a portion of the detecting rod being fixed to the container; mounting a magnet on a free end of the detecting rod at outside of the container, the magnet being movable; and detecting magnetic flux fluctuations by movement of the magnet so as to measure an existence of the agglomerates. This method enables the detection of agglomerates formed in the mixed phase container based on a value proportional to the moving velocity of the permanent magnets in association with the collision of agglomerates.

According to another aspect of the present invention, there is provided a method for detecting agglomerates, a part of the detecting rod is inserted in a protecting tube which is freely projecting into the container.

According to another aspect of the present invention, there is provided a method for detecting agglomerates, wherein a distributor plate specially designed to swirl gas and powders above the plate (referred to as "distributor plate" hereinafter) is disposed on the bottom of the mixed phase container for diffusing the gas in a horizontal direction, and the detecting rod is positioned at a predetermined height above the distributor plate. This method can control the flow of gas and powders within the mixed phase container, thereby effectively forcing the agglomerates to collide with the detecting rod.

According to another aspect of the present invention, there is provided an apparatus for detecting agglomerates in a mixed phase container in which a mixed phase of gas and powders is formed, the apparatus comprising: a detecting rod disposed with one end projecting freely into the container and the other end projecting freely at outside of the container, a portion of the detecting rod being fixed to the container; a magnet mounted on the free end of the detecting rod and movable about a point of the detecting rod as a fulcrum; and a magnetic flux detecting means, for detecting fluctuations produced by movement of the magnet. This arrangement enables the detection of agglomerates formed in the mixed phase container based on a value proportional to the moving velocity of the permanent magnets in association with the collision of agglomerates.

According to another aspect of the present invention, there is provided an apparatus for detecting agglomerates, wherein a distributor plate is disposed on the bottom of the mixed phase container for diffusing the gas in a horizontal direction, and the detecting rod is positioned at a predetermined height above the distributor plate. This arrangement can control the flow of gas and powders within the mixed phase container, thereby effectively forcing the agglomerates to collide with the detecting rod.

According to another aspect of the present invention, there is provided a fluidized-bed olefin polymerization reactor wherein a mixed phase of gas and powders is formed, the reactor having an apparatus for detecting agglomerates in the mixed phase, the apparatus comprising: a detecting rod disposed with one end projecting freely into the container and the other end projecting freely at outside of the container, a portion of the detecting rod being fixed to the container; a magnet mounted on the free end of the detecting rod and movable about a point of the detecting rod as a fulcrum; and a magnetic flux detecting means for detecting fluctuations produced by movement of the magnet.

According to another aspect of the present invention, there is provided an olefin polymerization method, said method having a method for detecting agglomerates in a mixed phase of gas and powders, said method comprising: disposing a detecting rod with one end projecting freely into said container and the other end projecting freely at outside of said container, a portion of said detecting rod being fixed to said container; mounting a magnet on a free end of said detecting rod at outside of said container, said magnet being movable; and detecting magnetic flux fluctuations by movement of said magnet so as to measure an existence of said agglomerates.

According to another aspect of the present invention, there is provided a method for manufacturing an olefin polymer, said method having a method for detecting agglomerates in a mixed phase of gas and powders, said method comprising: disposing a detecting rod with one end projecting freely into said container and the other end projecting freely at outside of said container, a portion of said detecting rod being fixed to said container; mounting a magnet on a free end of said detecting rod at outside of said container, said magnet being movable; and detecting magnetic flux fluctuations by movement of said magnet so as to measure an existence of said agglomerates.

The above and other objects, features, and advantages of the present invention will be apparent from the following description when taken in conjunction with the accompanying drawings which illustrates preferred embodiments of the present invention by way of example.

BRIEF DESCRIPTION OF THE DRAWINGS

FIG. 3 is a plan view of the distributor plate in FIG. 2;

FIG. 7 is a side cross-sectional view of the detecting rod according to a second embodiment of the present invention.

DETAILED DESCRIPTION OF THE PREFERRED EMBODIMENTS

An embodiment according to the present invention will be described below with reference to the accompanying drawings. In this embodiment, a fluidized-bed olefin polymerization reactor container is used as a mixed phase container.

Figure 1:
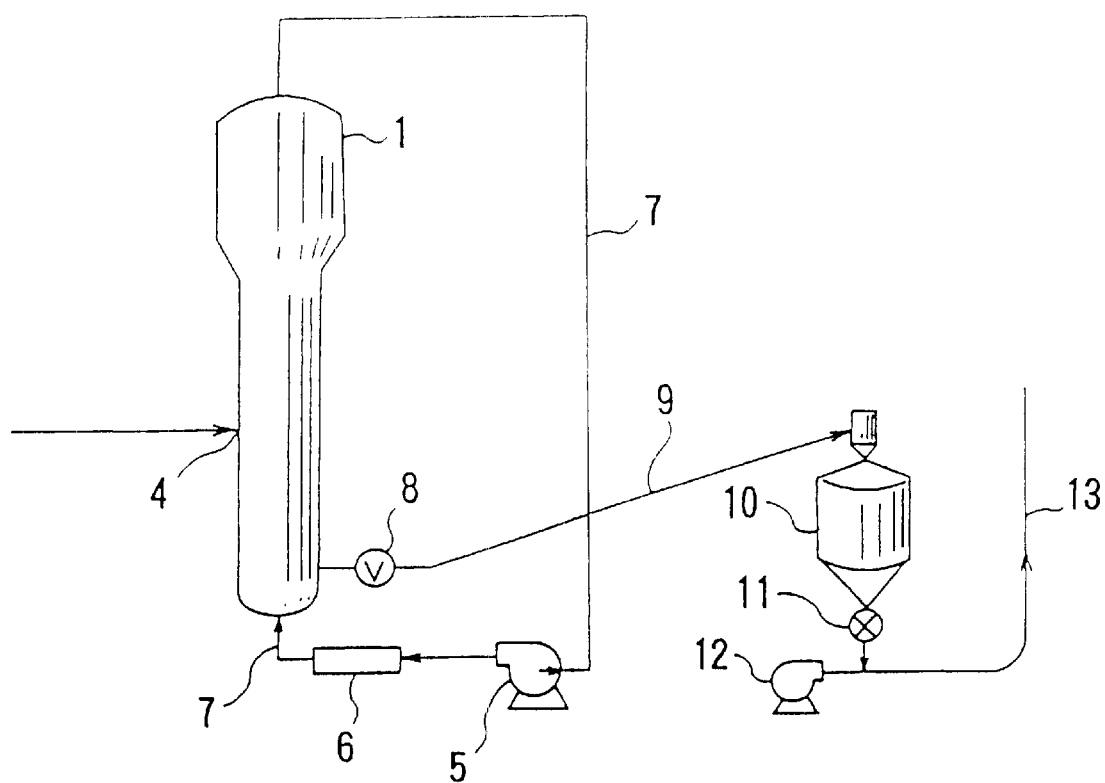
FIG. 1 is a schematic diagram showing a fluidized-bed olefin polymerization reactor container and its peripheral pipelines, according to an embodiment of the present invention.

FIG. 1 is a schematic diagram showing a fluidized-bed olefin polymerization reactor container and its peripheral pipelines. A mixed phase of gas and powders is formed and fluidized in a fluidized-bed olefin polymerization reactor container 1, which serves as a mixed phase container. A polymerization reaction occurs in such a state. The pressure in the fluidized-bed olefin polymerization reactor container 1 is approximately in the range from 1 to 3 MPa and the temperature approximately in the range from 70 to 100° C.

A catalyst and an olefin gas such as ethylene gas are supplied through an inlet 4 into the fluidized-bed olefin polymerization reactor container 1. A circulating gas constantly circulates via a gas line 7 by a circulating gas compressor 5. A heat exchanger 6 is provided along the path of the circulating gas for adjusting the temperature of the circulating gas.

A polymerization reaction occurred in the fluidized-bed olefin polymerization reactor container 1 generates such products as powdered polyethylene, polypropylene, or the like. These products pass through a discharge valve 8 and a discharge line 9 into a primary silo 10, in which the products are stored temporarily. The products are distributed into nitrogen-compressor line 13 by a rotary valve 11 and delivered to a desired location by wind-force of nitrogen-compressor blower 12.

Figure 2:
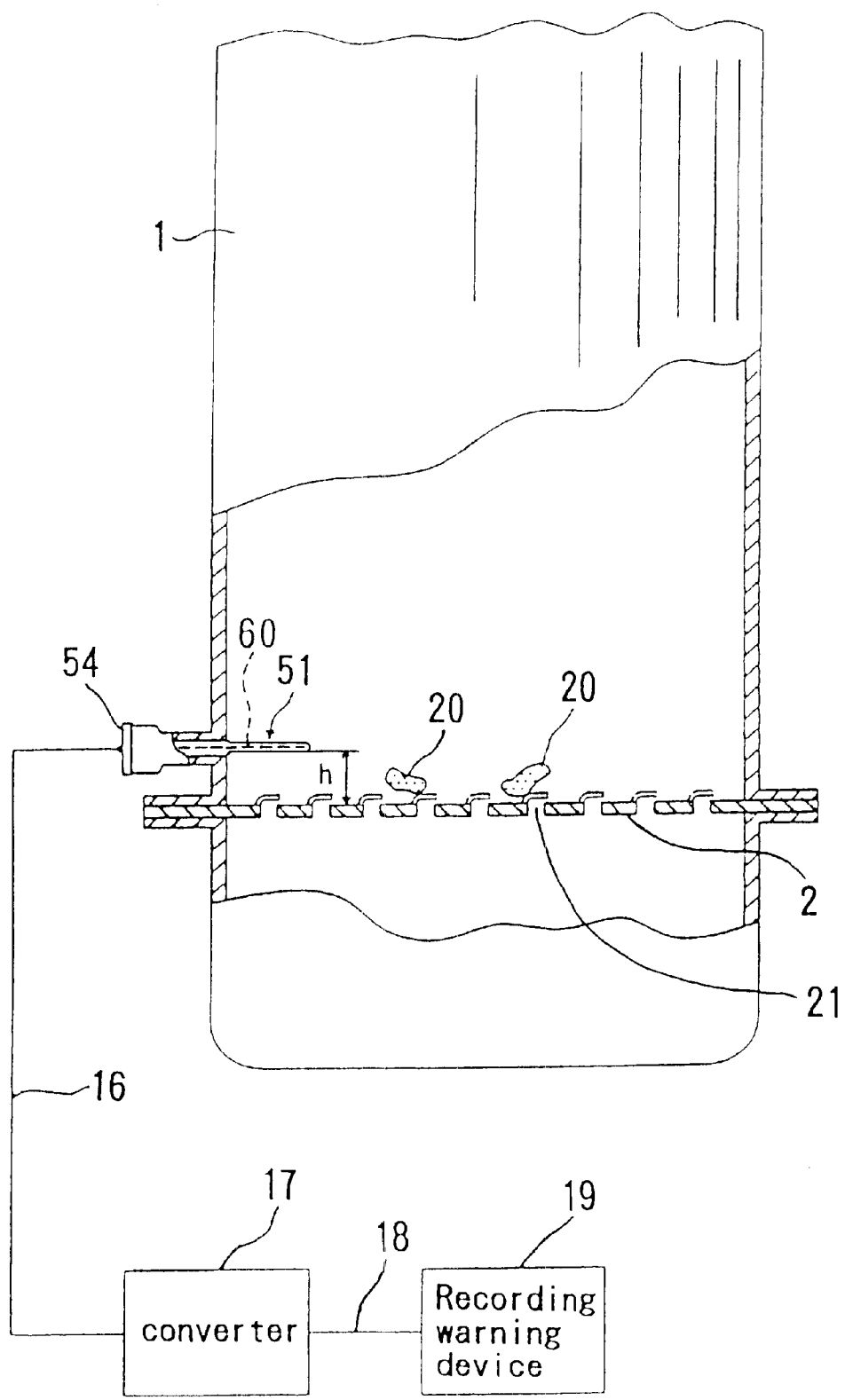
FIG. 2 is an enlarged diagram showing the lower portion of the fluidized-bed olefin polymerization reactor container according to an embodiment of the present invention.

FIG. 2 is an enlarged diagram showing the lower portion of the fluidized-bed olefin polymerization reactor container 1 with part of the container 1 cut out to illustrate its internal construction. The circulating gas supplied from the lower portion of the fluidized-bed olefin polymerization reactor container 1 flows upward from a plurality of opening holes 21 formed on the distributor plate 2 to form a mixed phase of gas and powders in the fluidized-bed olefin polymerization reactor container 1, in which a polymerization reaction occurs.

During this process, agglomerates 20 are formed in nodules due to variations in the state of the mixed phase. The process of this formation of agglomerates is not completely elucidated yet.

While the formed agglomerates 20 remain small, agglomerates circulate in the mixed phase in the floating state along with the flow of powders in the mixed phase. As the agglomerates 20 grow larger, however, agglomerates are no longer fluidized together with the powders and begin to settle in the mixed phase. Such agglomerates 20 generally accumulate near the distributor plate or else move irregularly due to the force of the circulating gas diffused from the opening holes on the distributor plate.

In order to move these large agglomerates 20 over the distributor plate 2, the inventors gave direction to the circulating gas diffused from the opening holes 21, and developed a distributor plate that forces the flow of gas and powders to move over the distributor plate 2 in a circular direction by orienting the opening holes 21 in the same circular direction (refer to Japanese Laid-open Patent Publication No. 6-136013). In the present embodiment, this distributor plate is used as the distributor plate 2.

As shown in FIG. 3, the opening holes 21 through which the gas is diffused are formed in concentric circles on the distributor plate 2, and streamlined caps 22 are disposed on top of the opening holes 21. With this construction, the gas is diffused in a horizontal direction from the opening holes 21 on the distributor plate 2. In FIG. 3, the gas flows in the counterclockwise direction.

Accordingly, the large agglomerates described above can be moved in a specific circular direction (counterclockwise in FIG. 3) along the gas flow over the distributor plate 2. As the behavior of agglomerates within the mixed phase is dependent not only on the size of the agglomerates but also on operating conditions, such as rate of gas flow, it is possible to move even large agglomerates with a high rate of gas flow.

As shown in FIG. 2, a detecting rod 60 is disposed inside the fluidized-bed olefin polymerization reactor container 1, and comprises a device for detecting agglomerates 20 formed by the adherence of each olefin polymer. The detecting rod 60 will be described below in detail.

Figure 4:
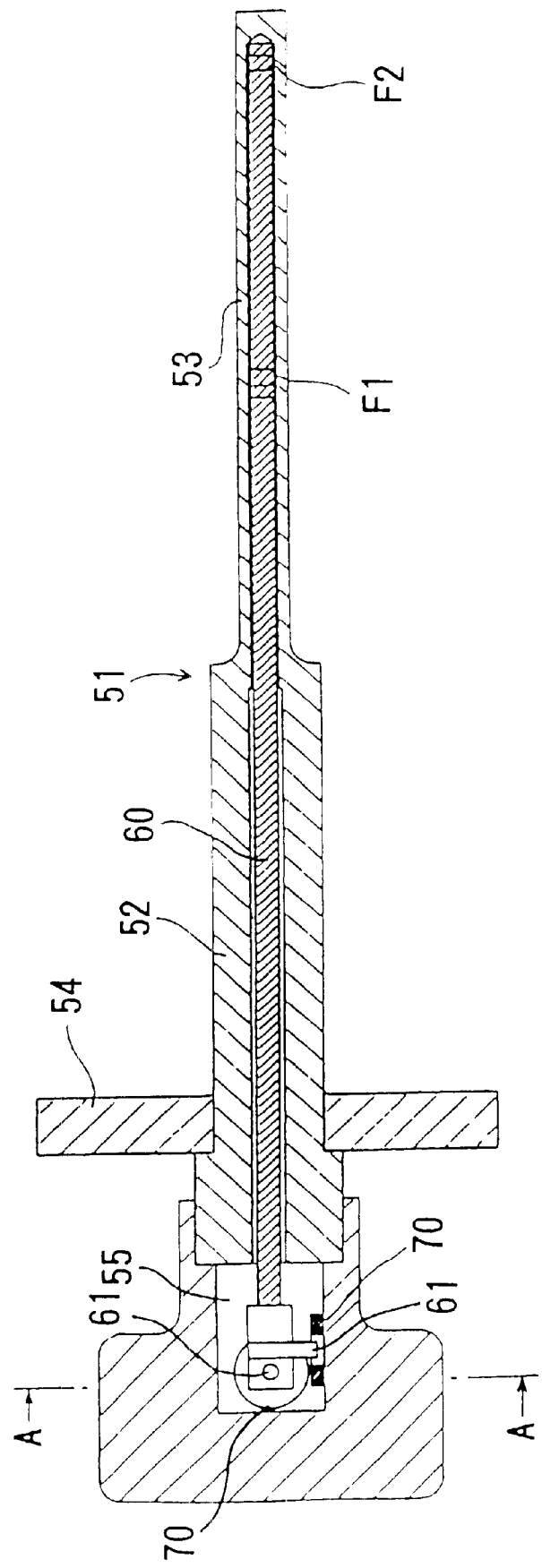
FIG. 4 is a side cross-sectional view of the detecting rod and the protecting tube in FIG. 2.
Figure 5:
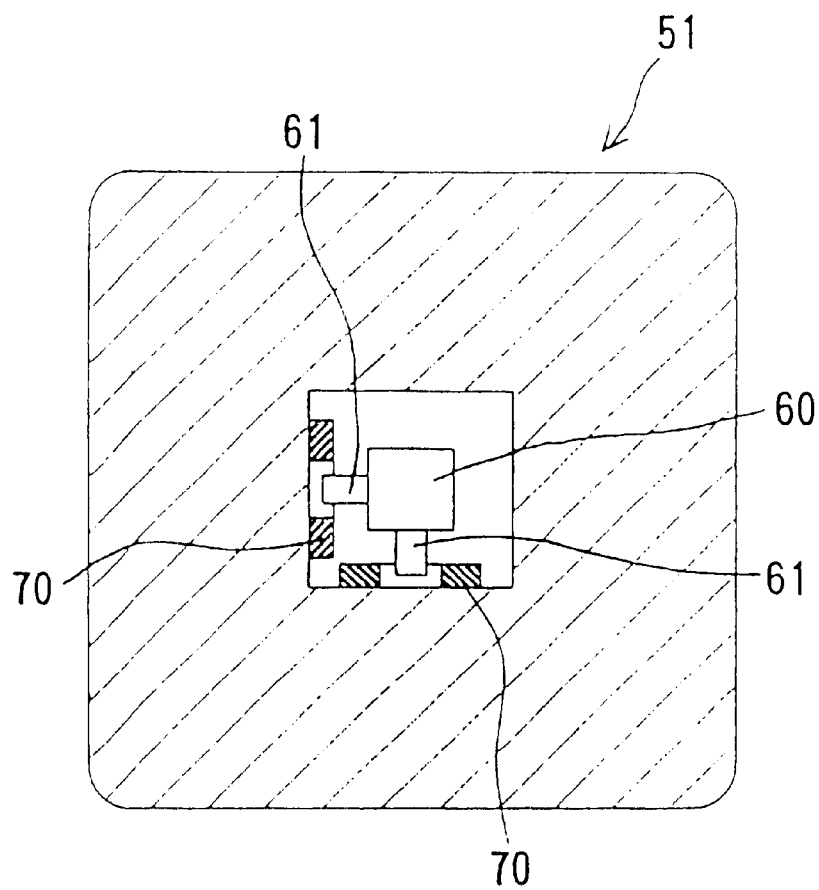
FIG. 5 is an enlarged cross-sectional view taken along a line A—A in FIG. 4.

FIG. 4 is a cross-sectional view showing the internal structure of the detecting rod 60 and the protecting tube 51. FIG. 5 is an enlarged cross-sectional view taken along a line A—A in FIG. 4.

The protecting tube 51 is supported like a cantilever with one end fixed to the side wall of the fluidized-bed olefin polymerization reactor container 1 and the other projecting freely into the reactor container 1. The protecting tube 51 is disposed at a predetermined height above the distributor plate 2. The protecting tube 51 is formed of stainless steel in the shape of a hollow cylinder. The detecting rod 60 is essentially housed within the protecting tube 51.

The protecting tube 51 comprises a fixed portion 52 having a large diameter (e.g. an outer diameter of 48 mm and inner diameter of 15 mm) and a projecting portion 53 having a small diameter (e.g. an outer diameter of 22 mm and inner diameter of 12 mm). The fixed portion 52 of the protecting tube 51 penetrates the side wall of the fluidized-bed olefin polymerization reactor container 1 and is fixed to the fluidized-bed olefin polymerization reactor container 1 by a flange 54.

The projecting portion 53 of the protecting tube 51 projects into the fluidized-bed olefin polymerization reactor container 1. With this structure, agglomerates 20 formed in the reactor container 1 are moved by the circulating flow and collide with the protecting tube 51, causing the protecting tube 51 to be deflected in the direction of the collision.

The detecting rod 60 is inserted into the protecting tube 51 and spans nearly the entire length of the protecting tube 51. One end of the detecting rod, 60 (the end on the projecting portion 53 of the protecting tube 51) is fixed to the protecting tube 51 by being screwed-at two points F1 and F2 shown in FIG. 4. The other end of the detecting rod 60 is free. Accordingly, the detecting rod 60 is fixed to the protecting tube 51 and supported like a cantilever.

The outer diameter of the detecting rod 60 (e.g. 10 mm) is smaller than the inner diameter of the fixed portion 52 of the protecting tube 51 and the projecting portion 53, thereby forming a space between the detecting rod 60 and the protecting tube 51. Accordingly, in association with movement (deflection) of the projecting portion 53 of the protecting tube 51, the detecting rod 60 moves within this space about the fastening point F1 as a fulcrum.

As shown in FIGS. 4 and 5, two cylindrically shaped permanent magnets 61 are mounted perpendicular to each other on the free end of the detecting rod 60. The permanent magnets 61 are housed in a chamber 55 provided in the base of the protecting tube 51.

Coils 70 as magnetic flux detecting means are provided on the left and bottom surfaces of the chamber 55 (based on the view shown in FIG. 5), corresponding to the positions of the permanent magnets 61. Specifically, the coils 70 are provided such that the axes of the coils 70 approximately coincide with the axes of the permanent magnets 61. In the present embodiment, the permanent magnets 61 and coils 70 are disposed such that the ends of the permanent magnets 61 are inserted into the centers of the coils 70 in their normal states.

As described above, if agglomerates 20 collide with the protecting tube 51, then the protecting tube 51 and the detecting rod 60 fixed to the protecting tube 51 are deflected in the direction of collision, and the detecting rod 60 moves within the space between the detecting rod 60 and protecting tube 51. Consequently, the permanent magnets 61 mounted on the detecting rod 60 also move in association with the detecting rod 60. Movement of the permanent magnets 61 fluctuates the magnetic flux inside the corresponding coils 70. The coils 70 as magnetic flux detecting means detect the fluctuations in magnetic flux to detect the existence of agglomerates 20 in the container.

Output signals from each of the magnetic flux detecting means (the coil 70) are inputted via a cable 16 into a converter 17 and converted to the current signals ranging from 4 to 20 mA thereby. The signals are transferred via a cable 18 into a recording warning device 19 to be monitored.

Since the pairs of permanent magnets 61 and coils 70 are mounted perpendicular to each other, as described above, one of the coil 70 can detect the change of magnetic flux, regardless of the direction in which the agglomerates 20 collide with the protecting tube 51.

More specifically, the fluctuations in magnetic flux inside the coils 70 produce an induced electromotive force e, shown below.

$$e = -N \times d\Phi/dt = NBlv$$

Here, N is the number of turns in the coil 70, $d\Phi/dt$ is the fluctuations in magnetic flux per unit of time, B is the magnetic flux density in the coil 70, l is the element length of the coil 70, and v is the moving velocity of the magnet.

Hence, when the protecting tube 51 and the detecting rod 60 fixed to the protecting tube 51 are deflected by collision of agglomerates 20, the permanent magnets 61 mounted on the detecting rod 60 move and produce an induced electromotive force in proportion to the moving velocity of the permanent magnets 61 in the coils 70. Therefore, it is possible to detect the existence of the agglomerates 20 based on detecting voltage fluctuations in the coils 70.

In this way, the state of agglomerates 20 formed in the fluidized-bed olefin polymerization reactor container 1 can be detected by fluctuations in the magnetic flux produced in the detecting rod 60. Further, the frequency of collisions by the agglomerates 20 against the protecting tube 51 and the size of agglomerates 20 can be measured by the voltage fluctuations and their period in the coils 70.

Consequently, the induced electromotive force is produced in proportion to the moving velocity of the permanent magnets 61. Hence, even if the permanent magnets 61 slightly move due to collision of relatively small agglomerates 20, the end of the detecting rod moves and the magnets move thereby to produce an induced electromotive force which can be measured. Specifically, it is possible to detect even small agglomerates 20, thereby enabling to increase sensitivity for detecting agglomerates 20 in the fluidized-bed olefin polymerization reactor container 1. According to the present embodiment, it is possible to detect agglomerates 20 weighing 500 grams or less.

The detecting rod 60 is mounted in the side of the fluidized-bed olefin polymerization reactor container 1 at a predetermined height above the distributor plate 2. This predetermined height h (refer to FIG. 2) may be set at a height to enable detection of agglomerates 20 of a size that can fit through the discharge valve 8, for example, ranging from about 5 to about 15 cm.

Figure 6:
FIG. 6 is a graph showing the amount of voltage measured in the coil during an experiment in which the detecting rod was disposed.

FIG. 6 shows a result of an actual experiment in which the detecting rod 60 was disposed in the fluidized-bed olefin polymerization reactor container 1 and agglomerates 20 were detected. In FIG. 6, the horizontal axis represents time, while the vertical axis represents voltage fluctuations, that is, the fluctuations in magnetic flux. In normal state, a certain load is applied to the protecting tube 51 by the circulating flow therein. The portion of the graph in FIG. 6 that is stabilized represents the normal state in the fluidized-bed olefin polymerization reactor container 1. The portion of the graph in which the amount of voltage fluctuations increases abruptly represents when the agglomerates 20 collide with the protecting tube 51.

Certainly, even if a distributor plate is used as described above, powders or agglomerates may not move strictly horizontally, but may move vertically as well. However, since the magnetic flux detecting means are disposed in the vertical direction of the detecting rod 60, as described above, it is still possible to detect vertically moving powders or agglomerates.

Occasionally, agglomerates 20 moving along the flow of gas and powders adhere to and accumulate on the part of the protecting tube 51 facing with the flow. In order to reduce the amount of accumulation, the protecting tube 51 is inserted at an angle in the range from 20 degrees to 70 degrees in relation to the flow of gas and powders. With this construction, it is possible to improve sensitivity and precision of detection.

A detecting rod 60 according to a second embodiment of the present invention will be described below with reference to FIG. 7. Like components in the present invention are designated by the same reference numerals to avoid duplicating description. FIG. 7 is a side cross-sectional view of the detecting rod 60.

Unlike in the first embodiment described above, an apparatus for detecting agglomerates according to the second embodiment is not provided with a protecting tube.

The detecting rod 60 is supported with a portion 62 of the detecting rod 60 fixed to the side wall of the fluidized-bed olefin polymerization reactor container 1 and one end projecting freely into the reactor container 1. The other end of the detecting rod is projecting freely into the chamber 55 and magnets are provided on the end thereof. The coils 70 as magnetic flux detecting means are fixedly provided in chamber 55 which is disposed in a body 10, which is fixed at the outside of the wall of the fluidized-bed olefin polymerization reactor container 1.

As in the first embodiment, this construction enables the measurement of magnetic flux fluctuations produced by movement of the permanent magnets 61 mounted on the end of the detecting rod 60. Accordingly, it is possible to detect the existence of the agglomerates 20 in the container.

As described above, according to the present invention, when agglomerates collide with a protecting tube and a detecting rod fixed to the protecting tube, magnets mounted on the detecting rod move to generate magnetic flux fluctuation in the coils. Magnetic flux fluctuations produced by movement of magnets enable the detection and measurements of the agglomerates. Since magnetic flux fluctuations are proportional to the moving velocity of the magnets caused by the collision of the agglomerates, it is easy to detect even the collision of small agglomerates. Accordingly, it is possible to improve the sensitivity for detecting agglomerates in the mixed phase container.

Further, according to the present invention, a distributor plate is provided in the bottom of the mixed phase container to force the gas to circulate in a horizontal direction. The detecting rod positioned at a specified height above the distributor plate enables to control the flow of gas and powders in the mixed phase container and effectively to force agglomerates to collide with the detecting rod. Accordingly, agglomerates can be detected with greater sensitivity.

Although certain preferred embodiments of the present invention have been shown and described in detail, it should be understood that various changes and modifications may be made therein without departing from the scope of the appended claims.

What is claimed is:

1. An apparatus for detecting agglomerates in a mixed phase container in which a mixed phase of gas and powders such as products of the olefin polymer and/or catalysts is formed, said apparatus comprising:
   a detecting rod disposed with one end projecting freely into said container and the other end projecting freely at outside of said container, a portion of said detecting rod being fixed to said container;
   a magnet mounted on the free end of said detecting rod and movable about a point of said detecting rod as a fulcrum; and
   a magnetic flux detecting means for detecting fluctuations produced by movement of said magnet.

2. An apparatus for detecting agglomerates according to claim 1, wherein a part of said detecting rod is inserted in a protecting tube which is freely projecting into said container.

3. An apparatus for detecting agglomerates according to claim 1, wherein a distributor plate is disposed on the bottom of said mixed phase container for diffusing the gas in a horizontal direction, and said detecting rod is positioned at a predetermined height above said distributor plate.

4. A fluidized-bed olefin polymerization reactor wherein a mixed phase of gas and powders is formed, said reactor having an apparatus for detecting agglomerates in said mixed phase, said apparatus comprising:
  a detecting rod disposed with one end projecting freely into said container and the other end projecting freely at outside of said container, a portion of said detecting rod being fixed to said container;
  a magnet mounted on the free end of said detecting rod and movable about a point of said detecting rod as a fulcrum; and
  a magnetic flux detecting means for detecting fluctuations produced by movement of said magnet.

5. A fluidized-bed olefin polymerization reactor according to claim 4, wherein a part of said detecting rod is inserted in a protecting tube which is freely projecting into said container.

6. A fluidized-bed olefin polymerization reactor according to claim 4, wherein a distributor plate is disposed on the bottom of said mixed phase container for diffusing the gas in a horizontal direction, and said detecting rod is positioned at a predetermined height above said distributor plate.

* * * * *